UNITED STATES PATENT OFFICE.

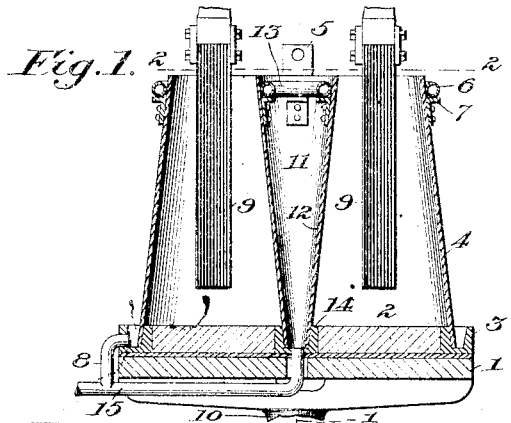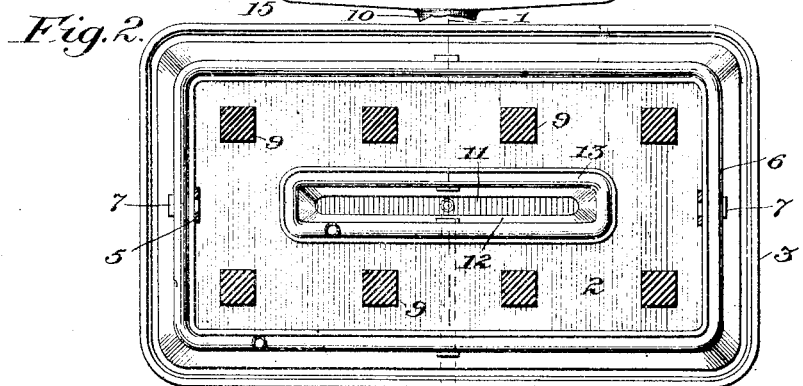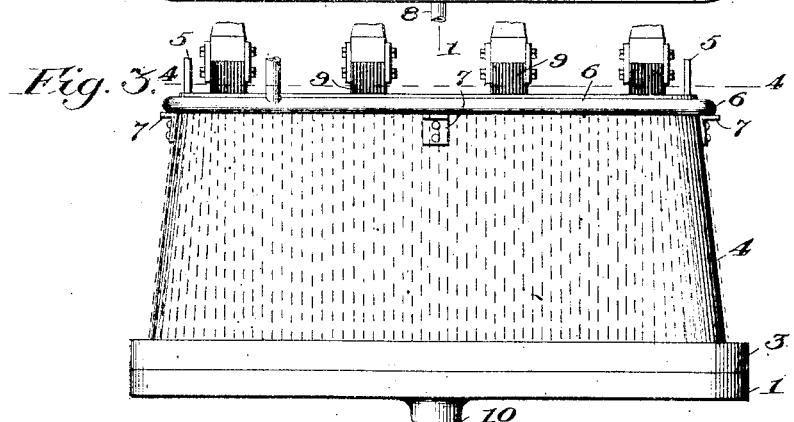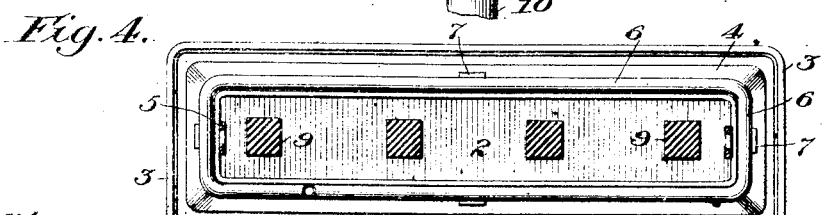

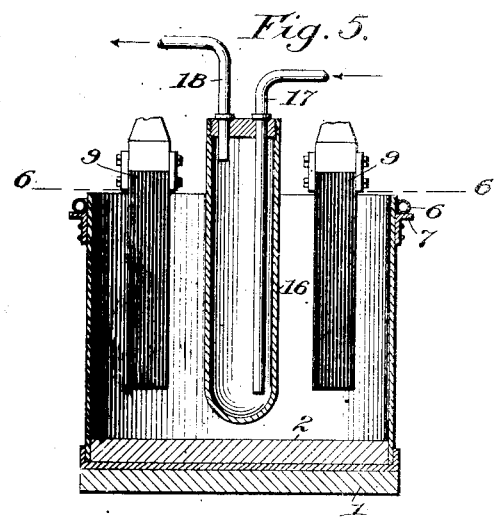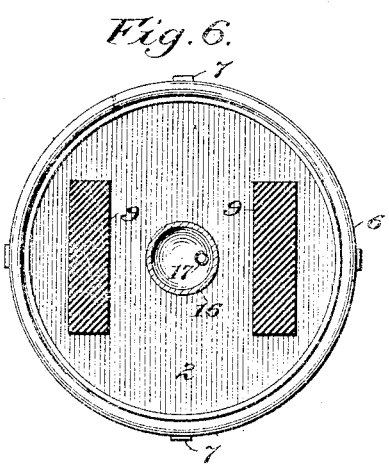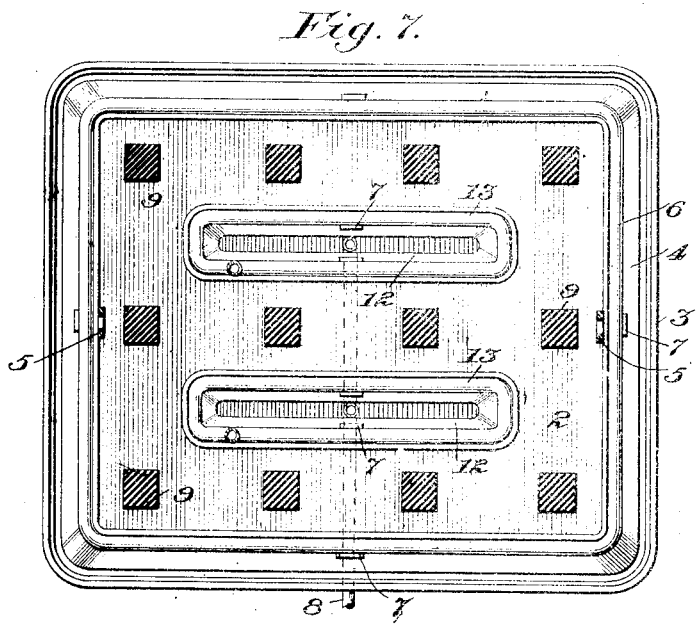

ALDUS C. HIGGINS, OF WORCESTER, MASSACHUSETTS.

ELECTRIC FURNACE.

No. 856,061.　　　　Specification of Letters Patent.　　　　Patented June 4, 1907.

Application filed April 6, 1906. Serial No. 310,359.

*To all whom it may concern:*

Be it known that I, ALDUS C. HIGGINS, a citizen of the United States, residing at Worcester, in the county of Worcester and State of Massachusetts, have invented certain new and useful Improvements in Electric Furnaces, of which the following is a specification.

The object of the present invention is to provide an electric furnace of relatively large capacity and so constructed as to permit the product to be formed and subsequently cooled under more nearly uniform temperature conditions than has heretofore been possible, and at a rate within the control of the operator. In its preferred form the furnace is designed to facilitate the discharge or removal of the product, and the walls are effectively protected against injury due to the high internal temperature.

For a full understanding of my invention reference is made to the accompanying drawings wherein:

Figure 1 is a central vertical section, on line 1—1 of Fig. 2, of one form of furnace constructed in accordance with my invention. Fig. 2 is a horizontal section on line 2—2 of Fig. 1. Fig. 3 is a side elevation of a modified form. Fig. 4 is a horizontal section on line 4—4 of Fig. 3. Fig. 5 is a central vertical section of a further modification. Fig. 6 is a horizontal section on line 6—6 of Fig. 5, and Fig. 7 is a horizontal section of another modification.

The type of furnace shown in Figs. 1, 2, 3, 4 and 7 comprises a movable hearth 1 having a refractory bed or lining 2, preferably of carbon, surrounded by a metallic trough or basering 3 which serves to collect the water used for cooling the furnace walls or chilling the product as hereafter described. The shell or furnace casing 4 may be constructed of boiler plate or sheet-iron, and is separable from the hearth, lugs 5 being provided for lifting it therefrom. The shell is preferably inwardly inclined toward its upper end as shown. Cooling of the furnace walls, and through them of adjacent portions of the product, is effected by water supplied through perforated pipes 6 surrounding the upper portion of the shell and supported thereon by lugs 7; the perforations in pipe 6 are arranged to direct the water against the shell 4 in such manner that it flows down the inclined surface thereof in an unconfined stream or film, substantially as described in my prior patent, No. 775,654, patented November 22, 1904, to be collected by the base-ring 3 and discharged through a suitable waste pipe 8. The furnace is shown as having stationary electrodes depending into the casing in position to heat the charge or material therein either by arc or incandescence; the crucible is adapted to be gradually lowered during the operation, as for instance by means of a direct plunger hydraulic elevator the plunger of which is shown at 10.

In electric furnace operations it is frequently desirable that overheating of the product should be avoided, and also that the product should be cooled or chilled at a definite rate within the control of the operator. As one example of an operation of this character I may mention the production of an abrasive by the fusion of an aluminous material into a pig or mass, as more fully set forth in my copending application, Serial No. 307,090, filed March 20, 1906. The character of the product in this case is dependent upon the rate at which the fused material is cooled, and it is obvious that in a furnace of large diameter the rate of cooling of a given portion of the product through external walls will depend upon the distance of such portion from the walls; and that owing to this fact the final product will vary considerably in character in accordance with such distance. In my construction such differences are minimized, and by properly proportioning the furnace in accordance with the character of the product, material which is sufficiently uniform for commercial purposes is readily obtained.

The essential feature of my construction is the production of a furnace which is of such form that while a large capacity is provided, all portions of the charge are brought within the cooling influence of cooled walls, in such manner as to secure commercial uniformity of the product. To this end I provide a relatively long and narrow furnace chamber and means for cooling the walls of the chamber. The expression relatively long and narrow as herein employed is not intended to indicate that the chamber must necessarily be substantially rectilinear but is intended to include annular or equivalent constructions.

Figs. 1 and 2 show a furnace wherein a chamber of this character and of great capacity is formed by providing within a substantially rectangular chamber a central well 11, having inclined walls 12, constituting the interior walls of the furnace chamber, said well 11 being in fact a conduit for a cooling fluid. The interior walls are shown as cooled by water from a perforated pipe 13, the water flowing freely down the walls and being collected in a basin 14 and permitted to escape through a waste pipe 15.

Figs. 3 and 4 illustrate a furnace of simplified form, having opposite and substantially flat water cooled walls, in such proximity to each other as to effect a suitable cooling of the interposed charge.

Figs. 5 and 6 illustrate a further modification comprising a cylindrical chamber with depending electrodes 9 9. Instead of the central well I provide in this construction an equivalent device consisting of a water cooled casing 16 which is inserted into the material between the electrodes and the walls of which form interior walls of the furnace chamber. This casing may be of sheet metal and is provided with an inlet 17 for water extending nearly to its bottom, and an outlet 18 near the top. A casing of this character, like the water cooled walls before referred to, becomes covered in use with a solidified crust derived from the charge, and is sufficiently permanent for practical use even in operations requiring such high temperatures as are required for the fusion of alumina.

It will be understood that the region between the electrodes is usually the zone of highest temperature, more particularly in the case of incandescent furnaces, and a substantial uniformity of temperature may be secured by abstracting heat from this region.

Fig. 7 illustrates a modification substantially equivalent to that shown in Figs. 1 and 2 but of greater capacity, the increased capacity being rendered possible by the provision of a plurality of wells or conduits 11 for the cooling fluid.

I claim:

1. An electric furnace comprising a relatively long and narrow furnace chamber, a plurality of electrodes of each polarity depending into the same, and means for cooling the furnace walls, substantially as described.

2. An electric furnace comprising a relatively long and narrow furnace chamber, the dimensions of said chamber being such as to permit the effective cooling of all portions of the charge and the production of a commercially uniform product by means of a cooling medium applied to the furnace walls, a plurality of electrodes of each polarity depending into the same, and means for cooling the furnace walls, substantially as described.

3. An electric furnace comprising a hearth, a casing separable therefrom and having inclined exterior and interior walls, and means for cooling said walls, substantially as described.

4. An electric furnace comprising a furnace chamber having exterior walls, electrodes of opposite polarity within said chamber a plurality of interior walls between said electrodes, and means for cooling said interior walls, substantially as described.

5. An electric furnace comprising a furnace chamber, spaced electrodes of opposite polarity therein providing an intermediate heating zone, an open well between said electrodes, and means for cooling the walls of said well, whereby a comparatively uniform temperature is obtained throughout the furnace chamber, substantially as described.

6. An electric furnace comprising a furnace chamber having exterior and interior walls, said walls being exposed on one side to the charge and on the other side to the atmosphere, substantially as described.

7. An electric furnace comprising a furnace chamber having exterior and interior walls, said walls being exposed on one side to the charge and on the other side to the atmosphere, and means for cooling said interior walls, substantially as described.

8. An electric furnace comprising a furnace chamber having exterior and interior walls, said walls being exposed on one side to the charge and on the other side to the atmosphere electrodes oppositely disposed with respect to said interior walls, and means for cooling said interior walls, substantially as described.

9. An electric furnace comprising a furnace chamber having exterior and interior walls, said walls being exposed on one side to the charge and on the other side to the atmosphere, and means for cooling said exterior and interior walls.

In testimony whereof, I affix my signature in presence of two witnesses.

ALDUS C. HIGGINS

Witnesses:
C. P. TOWNSEND,
C. H. POTTER.